(12) United States Patent
Hezari et al.

(10) Patent No.: US 8,342,809 B2
(45) Date of Patent: Jan. 1, 2013

(54) DEVICE FOR A RUNNER

(75) Inventors: Reza Hezari, Trondheim (NO); Ole Gunnar Dahlhaug, Trondheim (NO)

(73) Assignee: Dynavec AS (NO)

( * ) Notice: Subject to any disclaimer, the term of this patent is extended or adjusted under 35 U.S.C. 154(b) by 317 days.

(21) Appl. No.: 12/744,847

(22) PCT Filed: Nov. 17, 2008

(86) PCT No.: PCT/NO2008/000407
§ 371 (c)(1),
(2), (4) Date: Oct. 7, 2010

(87) PCT Pub. No.: WO2009/072892
PCT Pub. Date: Jun. 11, 2009

(65) Prior Publication Data
US 2011/0033304 A1    Feb. 10, 2011

(30) Foreign Application Priority Data
Dec. 5, 2007  (NO) .................................. 20076266

(51) Int. Cl.
*F04D 29/24* (2006.01)
(52) U.S. Cl. ............ 416/186 R; 416/214 R; 416/214 A; 416/220 R; 416/221
(58) Field of Classification Search ............... 416/186 R, 416/214 R, 214 A, 220 R, 221
See application file for complete search history.

(56) References Cited

U.S. PATENT DOCUMENTS

| | | | |
|---|---|---|---|
| 1,676,946 A | | 12/1926 | Fechheimer |
| 1,741,787 A | | 12/1929 | Moody |
| 1,762,124 A | | 6/1930 | Moody |
| 2,611,578 A | | 9/1952 | Biggs |
| 3,144,204 A | | 8/1964 | Bohanon |
| 3,260,443 A | * | 7/1966 | Garnett et al. ................ 416/182 |
| 3,608,172 A | | 9/1971 | Lindquist |
| 3,782,853 A | * | 1/1974 | Frister ...................... 416/132 R |
| 4,236,871 A | | 12/1980 | Hirst et al. |
| 6,402,467 B1 | | 6/2002 | Godichon et al. |
| 2008/0232967 A1 | | 9/2008 | Salvesen |
| 2008/0286130 A1 | * | 11/2008 | Purvines .................... 417/410.1 |

FOREIGN PATENT DOCUMENTS

| | | |
|---|---|---|
| DE | 19803390 C1 | 2/1999 |
| EP | 0 942 174 A | 9/1999 |
| GB | 196254 A | 2/1924 |
| NO | 4288 | 1/1895 |
| SE | 522166 A | 6/1940 |
| SE | 365287 B | 3/1974 |
| SE | 505375 C2 | 8/1997 |
| WO | 2007/037699 A | 4/2007 |

* cited by examiner

*Primary Examiner* — Ninh H Nguyen
(74) *Attorney, Agent, or Firm* — Akerman Senterfitt

(57) ABSTRACT

A device for a runner (1) for a fluid machine comprising a runner hub (2) and a number of blades (4) distributed around the centre axis (8) of the runner (1), each blade (4) being detachably connected to the runner (1).

6 Claims, 3 Drawing Sheets

DEVICE FOR A RUNNER

This invention relates to a runner. More particularly, it relates to a runner for a fluid machine comprising a runner hub and a number of blades distributed around the centre axis.

Runners for fluid machines such as pumps and turbines can be subject to wear for example from sand-particle-laden river water which is led through the runner.

Runners are often manufactured as cast or welded structures to provide the required, often relatively complicated, blade geometry with sufficient accuracy. In addition, considerable work is put into the finishing of a runner to achieve substantially cavitation-free flow and acceptable efficiency.

Wear in runners is often the largest on a few components, typically on the blades. Known runners have not been arranged for individual replacement of the components of the runner.

U.S. Pat. No. 3,608,172 discloses a runner which is assembled from four runner sectors, each sector, which includes a runner hub portion, a runner ring portion and at least one blade, being replaceable. However, the individual replacement of, for example, blades is not possible.

The invention has for its object to remedy or reduce at least one of the drawbacks of the prior art.

The object is achieved through features which are specified in the description below and in the claims that follow.

A runner for a fluid machine is provided, comprising a runner hub and a number of blades distributed around the centre axis of the runner, the runner being characterized by each blade being detachably connected to the runner.

An aspect of the runner is that the blade fits complementarily into a groove in the runner hub, or that a bead in the runner fits complementarily into a groove in the blade. The groove may be divided.

Another aspect of the runner is that the runner is closed by means of a runner ring.

A further aspect of the runner is that the blade is formed with a hollow key at its mounting in at least one of the runner hub or the runner ring.

The blade is typically given a curved shape to achieve a satisfactory flow pattern and good efficiency.

A blade is manufactured with a complete geometry and dimension before it is fitted into the runner. The blade may be manufactured by means of precision casting, in which the so-called lost-wax casting method is a well suited method. Machining by means of a machine tool programmed for the purpose is another well suited manufacturing method.

Yet another aspect of the runner is that the blade is connected to the runner hub by means of a bolt connection, a rivet connection or a dove-tail connection.

A further aspect of the runner is that the surface of the blade is wear-resistant in relation to the rest of the blade. The increased wear resistance at the surface of the blade may be provided by a coating of a material which is different from the blade material, or by treatment of the part of the blade material which is located at the surface.

Relevant coatings may include for example carbides, minerals, synthetic materials or other relatively hard-wearing materials.

Treatment of the blade material at the blade surface may include for example thermal, chemical or mechanical finishing.

The blade wheel provided, in which at least the blades may be provided with a relatively wear-resistant surface, is arranged for relatively simple replacement of worn or damaged blades without this normally necessitating a subsequent laborious supplementary adjustment of the flow path of the blade wheel.

In what follows is described an example of a preferred embodiment which is visualized in the accompanying drawings, in which.

Figure 1:
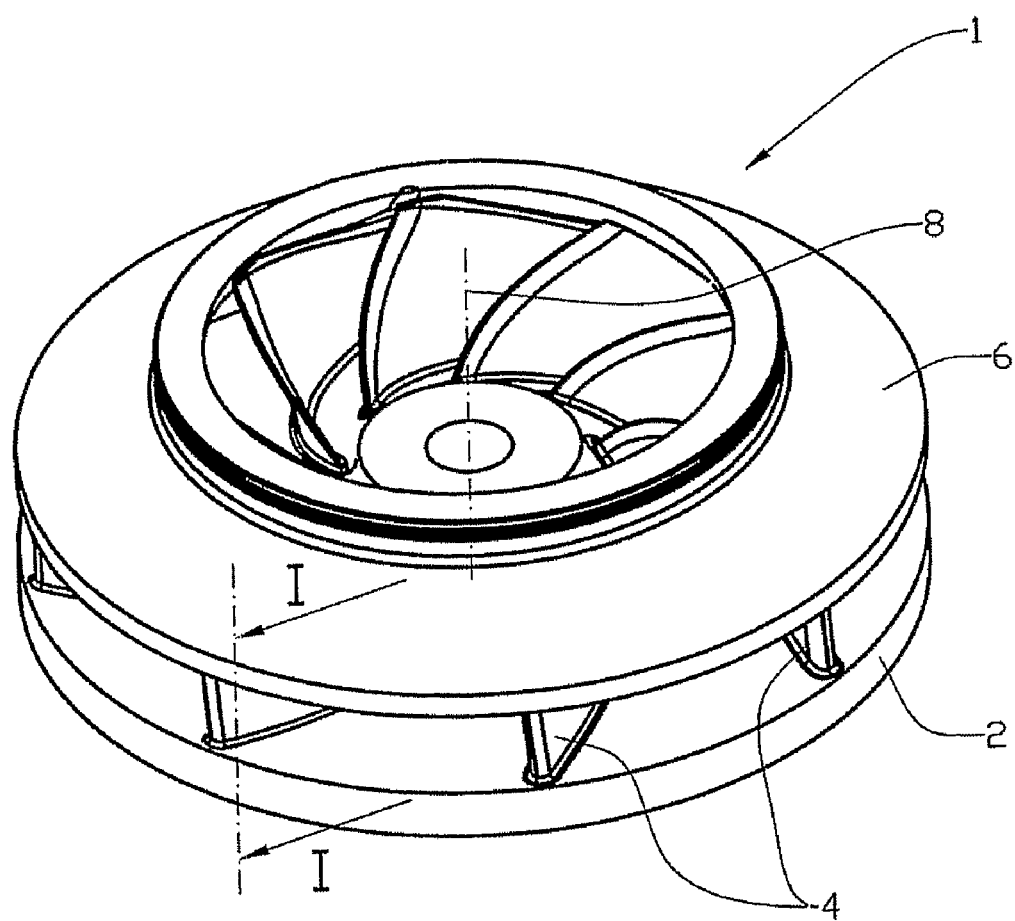
FIG. 1 shows a runner in perspective.

In the drawings the reference numeral 1 indicates a runner comprising a runner hub 2, a number of blades 4 and a runner ring 6. During operation the runner 1 rotates about the centre axis 8 of the runner 1.

Figure 2:
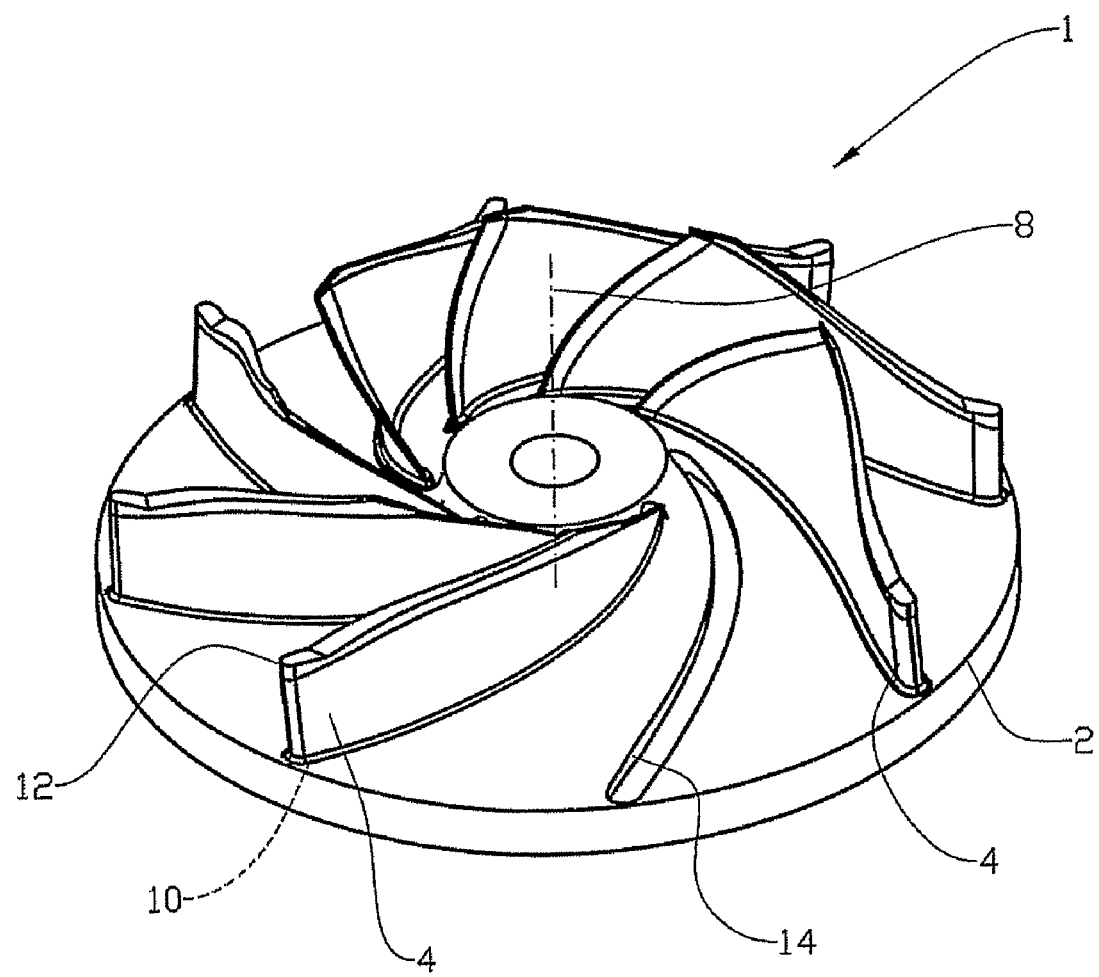
FIG. 2 shows the runner of FIG. 1 in perspective after the runner ring of the runner and one blade have been removed.
Figure 3:
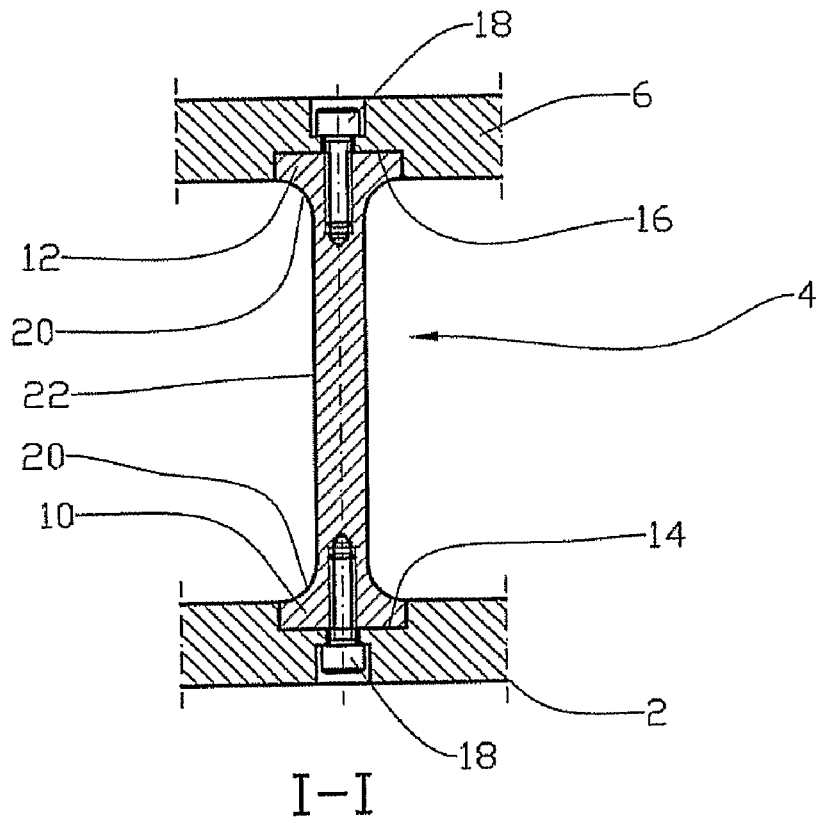
FIG. 3 shows a section I-I of FIG. 1 on a larger scale.

Each blade 4 is formed with a longitudinal first edge portion 10 and a longitudinal second edge portion 12 fitting complementarily into respectively a first groove 14 in the runner hub 2 and a second groove 16 in the runner ring 6, see FIGS. 2 and 3.

The blades 4 are connected to the runner hub 2 and to the runner ring 6 by means of screw connections 18.

The blades 4, which have been given a relatively complicated geometry, are manufactured with sufficient accuracy for the runner 1 to be put to use after balancing, without further supplementary work.

At their respective edge portions 10, 12, the blades 4 are formed with hollow keys 20 to increase the strength of the blades 4, reduce wear from particles and improve the fluid flow through the runner 1.

Under some operating conditions in which the runner 1 is subject to particularly great wear, a coating 22 containing carbide has been applied to the blades 4.

Figure 4:
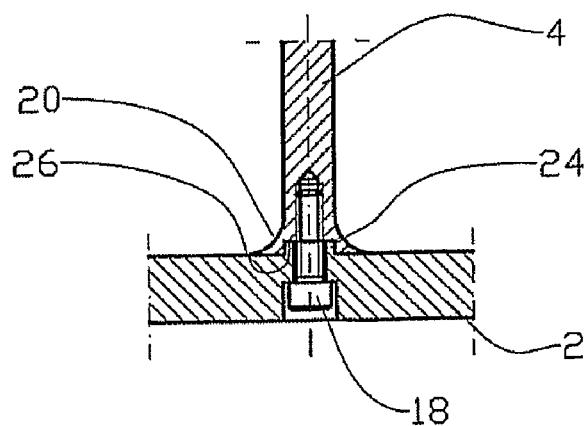
FIG. 4 shows a section corresponding to the section in FIG. 3, but of an alternative embodiment.

In an alternative embodiment, see FIG. 4, the runner hub 2 is provided with a bead 24 fitting complementarily into a groove 26 in the blade 4.

The invention claimed is:

1. A runner for a liquid machine that is designed to work in sand-containing water, comprising:
    a runner hub that has a curvature on a blade side thereof, and
    a plurality of curved blades distributed around a centre axis of the runner, wherein each blade is detachably connected to the runner hub
    wherein each blade fits complementarily into a groove in the runner hub, the groove following the curvature of the blade as well as the curvature of the runner hub surface.

2. The runner in accordance with claim 1, wherein the groove is divided.

3. The runner in accordance with claim 1, wherein the runner is closed by means of a runner ring.

4. The runner in accordance with claim 1, wherein the blade is formed with a hollow key at its mounting in at least the runner hub or a runner ring.

5. The runner in accordance with claim 1, wherein the blade is connected to the runner hub by means of a bolt connection.

6. The runner in accordance with claim 1, wherein the blade is connected to the runner hub by means of a rivet connection.

* * * * *